US012495195B2

United States Patent
Rathbun et al.

(10) Patent No.: US 12,495,195 B2
(45) Date of Patent: Dec. 9, 2025

(54) CAMERA MOUNT FOR TRAILER JACK

(71) Applicant: BAUER PRODUCTS, INC., Grand Rapids, MI (US)

(72) Inventors: Daren Rathbun, Coldwater, MI (US); Robert Bos, Grand Haven, MI (US); Bruce Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 191 days.

(21) Appl. No.: 18/066,680

(22) Filed: Dec. 15, 2022

(65) Prior Publication Data

US 2023/0188820 A1 Jun. 15, 2023

Related U.S. Application Data

(60) Provisional application No. 63/265,468, filed on Dec. 15, 2021.

(51) Int. Cl.
*H04N 23/54* (2023.01)
*B60R 11/04* (2006.01)
*G03B 17/56* (2021.01)
*G03B 30/00* (2021.01)
*H04N 23/51* (2023.01)
*H04N 23/57* (2023.01)
*B60R 11/00* (2006.01)

(52) U.S. Cl.
CPC ............. *H04N 23/54* (2023.01); *B60R 11/04* (2013.01); *G03B 17/561* (2013.01); *G03B 30/00* (2021.01); *H04N 23/51* (2023.01); *H04N 23/57* (2023.01); *B60R 2011/004* (2013.01); *B60R 2011/0057* (2013.01); *B60R 2011/0085* (2013.01); *B60R 2300/406* (2013.01); *B60R 2300/808* (2013.01)

(58) Field of Classification Search
CPC ........ H04N 23/50; H04N 23/51; H04N 23/54; H04N 23/57; B60R 11/04; B60R 1/20; B60R 1/22; B60R 1/26; B60R 2300/406; B60R 2300/80; B60R 2300/808; G03B 17/561; G03B 30/00
See application file for complete search history.

(56) References Cited

U.S. PATENT DOCUMENTS

2015/0172518 A1* 6/2015 Lucas ........................ B60R 1/30
  348/148
2022/0212668 A1* 7/2022 Joseph ..................... B60Q 1/50

* cited by examiner

Primary Examiner — Daniel M Pasiewicz
(74) Attorney, Agent, or Firm — Greer, Burns & Crain, Ltd

(57) ABSTRACT

A mount for a remote camera for use with a jack. The remote camera is wirelessly coupled to a processor-based device, and contained within a housing that is rotatably coupled to a base mounted to a surface, or is integrated within a control box of the jack.

11 Claims, 13 Drawing Sheets

CAMERA MOUNT FOR TRAILER JACK

CROSS-REFERENCE TO RELATED APPLICATION

This application claims the priority of and benefit to U.S. Provisional Patent Application Ser. No. 63/265,468, filed Dec. 15, 2021, which is incorporated in its entirety by reference herein.

FEDERALLY SPONSORED RESEARCH OR DEVELOPMENT

N/A

FIELD

The present disclosure relates generally to the field of equipment for vehicles. Embodiments of the invention relate more particularly to devices for assisting with operating or controlling a trailer jack.

BACKGROUND

Trailer jacks, also known as hitch jacks, are known in the art for raising and lowering a trailer for connecting to a hitch of a vehicle, e.g., for towing contents on the trailer. The trailer jack typically is attached to a tongue of the trailer and includes an extendable shaft that extends vertically to the ground and terminates with a wheel or a base that contacts the ground. A gear mechanism or other mechanism can be provided in the trailer jack for extending and retracting the shaft.

In a typical operation, the user controls the trailer jack to extend the shaft, raising the trailer off the ground to an elevated position. The vehicle is positioned so that a hitch (e.g., a ball hitch) mounted on the vehicle is lined up with and disposed underneath a coupler on the tongue. The user then controls the trailer jack to retract the shaft, lowering the trailer and the coupler onto the hitch to secure the trailer to the vehicle.

The gear mechanism of the trailer jack can be controlled manually, such as with a manual crank. Electric jacks or power jacks can include a control box that operate a motorized crank, e.g., powered by the vehicle's battery, to control the extension of the shaft and thus the height of the trailer. A typical control box can be controlled using one or more buttons or switches (e.g., up/down switches, power switches, etc.) disposed thereon.

Backing a vehicle to precisely line up the hitch with the trailer and safely connect, or hook up, the trailer to the hitch is challenging for even an experienced operator. For instance, it can be difficult for an operator to access the trailer jack for operation, or to view the relative positions of the hitch and the trailer tongue before or while raising or lowering the jack. The user may need to make several attempts, entering and exiting the vehicle repeatedly, to properly align the hitch and the trailer. If the hitch and trailer are not correctly aligned, raising or lowering the trailer can result in damage and/or injury.

Thus, there is a need for methods and systems that help a user to align a vehicle hitch with a trailer when operating or controlling a jack, such as an electric jack. There is a further need for methods and system that assist a user with controlling (raising and lowering) an electric jack while providing useful image feedback information.

SUMMARY

According to one aspect of the disclosed embodiments, a mount is provided for a remote camera for use with a jack. The remote camera may be wirelessly coupled to a processor-based device. The mount comprises a camera housing rotatably coupled to a base. The camera housing is configured for housing the camera and a wireless module for the camera therein and includes an opening for a lens of the camera. The base is configured for removable mounting to an interior or exterior surface.

Example interior or exterior surfaces include, for instance, surfaces of a jack, a vehicle, a trailer, a hitch, or other surfaces. The rotation between the camera housing and the base may be fixable. The base may have a magnetic surface, and/or may include one or more attachment devices for removably attaching the base to the interior or exterior surface.

A camera may be disposed within the camera housing and include a lens aligned with the opening. A wireless module may be disposed within the camera housing and coupled to the camera. The camera and the wireless module may be disposed on a printed circuit board contained within the camera housing.

A processor-based device may be configured for wireless communication with the camera using a wireless protocol. The processor-based device may include an application for displaying images transmitted from the camera.

According to another aspect of example embodiments, a control box for an electric jack is provided. The control box includes a control box housing; a camera; a wireless module; and a camera mount for the camera and the wireless module. The camera mount is integrated within the control box housing and includes an opening for a lens of the camera.

The camera mount may include a fixed compartment disposed within the control box housing, the fixed compartment including the opening for the lens. The camera and the wireless module may be disposed within an interior of the fixed compartment. The camera and the wireless module may be disposed on a printed circuit board, and the printed circuit board may be disposed within the interior of the fixed compartment.

A processor-based device may be configured for wireless communication with the camera using a wireless protocol. The processor-based device may include an application for displaying images transmitted from the camera.

A jack controller for the electric jack may be configured for communication with the processor-based device, for instance, using a wireless protocol. The processor-based device may include an application for displaying images transmitted from the camera. The application may further provide a user interface for a user to control the electric jack. The application may be configured for integrating one or more controls for the jack controller with the displayed images.

According to another aspect of example embodiments, a method for controlling an electric jack by a processor-based device is provided, the method comprising: receiving, by an application on the processor-based device, video image signals transmitted by a remote camera, the remote camera being in a housing that is integrated within a control box of the electric jack, and/or rotatably coupled to a base, the base being configured for removable mounting to an interior or exterior surface of (for instance) one or more of a jack, a vehicle, a trailer, or a hitch; the application displaying a video image from the received video image signals; and the application presenting one or more controls for controlling the trailer jack via a user interface. In response to receiving an input from a user via the user interface, the application transmits a command signal to the electric jack for raising or lowering the electric jack. The electric jack can be configured to raise or lower in response to the received command signal. The user interface may be integrated with the displayed video image, e.g., on a display of the processor-based device.

Various examples are disclosed herein.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference in their entireties for all purposes.

DESCRIPTION OF THE DRAWINGS

The drawings set forth herein are illustrative of exemplary embodiments provided herein and are not meant to limit the scope of the invention as encompassed by the claims.

The present disclosure will become more fully understood from the detailed description and the accompanying drawings, wherein.

In the drawings, reference numbers may be reused to identify similar and/or identical elements.

DETAILED DESCRIPTION

Figure 1:
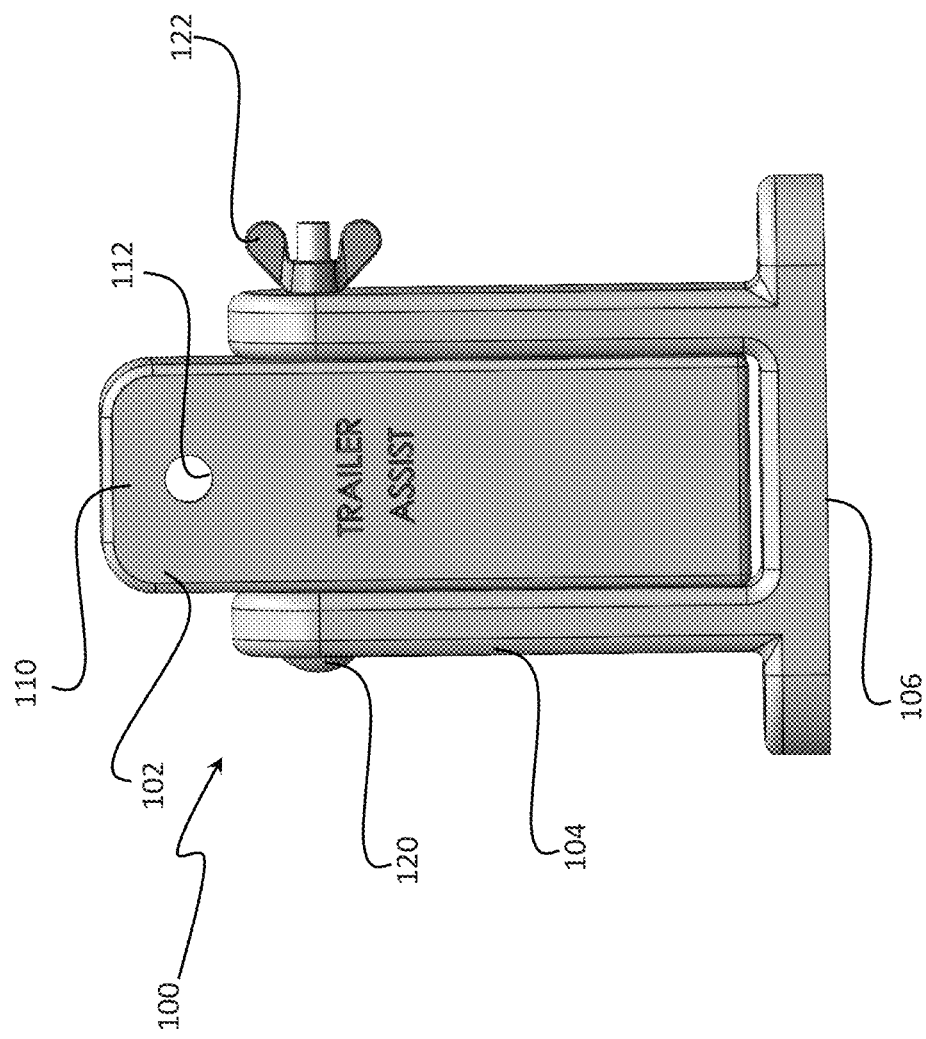
FIG. 1 is a front perspective view of a camera mount for a remote camera according to example embodiments.

Example embodiments provide apparatuses, systems, and methods for assisting with operation of an electric jack. An example system includes a self-contained remote camera integrated with the electric jack, a vehicle, a trailer, or a hitch. The remote camera is in communication with a processor-based device, such as a smartphone, tablet computer, vehicle computer, a standalone device, or any other suitable device. The processor-based device may include an application (app) executed thereon using computer-readable instructions, such as a native application, a remote application, or an interfacing application such as but not limited to Apple® CarPlay. The remote camera is configured for providing images such as video images to the processor-based device. The remote camera can be coupled, e.g., wired or wirelessly, to a power source, such as the battery-powered electric system of the vehicle or to any other suitable power source to provide a constant power source, and/or can include one or more batteries or other power sources for local or wireless power.

The processor-based device can further be configured for communication with the electric jack to remotely control operation (e.g., raising and lowering) of the electric jack. Communication can be performed, for example, via an application resident on the processor-based device. "Application" or "app" herein can refer to one or more applications operating alone or in combination. The application can provide a user interface for controlling operation of the electric jack and for receiving and displaying video images (a video feed) from the remote camera. The user interface and the displayed video images can be integrated with one another.

A camera mount can be provided in example embodiments for mounting the camera in a remote position with respect to the processor-based device. The camera mount can integrate the remote camera with (e.g., connect directly or indirectly to, position in, at, on, or near, etc.) a mounting location such as but not limited to the electric jack, the vehicle, the trailer, and/or the hitch. The camera mount can include a power source, e.g., one or more batteries (e.g., AA batteries), solar cells, etc. disposed in a compartment of the mount and wired to the camera for powering the camera and/or for controlled movement (e.g., rotation or other positioning) of the camera mount. The camera mount may, but need not, further include a location-tracking device, such as a GPS device or tag, for tracking a location of the mount, camera, trailer, etc. This is useful, as trailers are often a target for thieves, though it is not required in all embodiments.

Camera mounting may be fixed, movable, and/or permanent. The camera mount can include a base such as a magnetic base to allow the mount to be easily movable, and/or the camera and/or the camera mount can be provided with other attachment devices or mechanisms, such as suction cups (e.g., attached to countersinks of the camera and/or mount), screws or other fasteners, etc., for attachment of a base to the electric jack, vehicle, trailer, or hitch, for example.

The base can be configured to allow the remote camera installed therein to rotate. The camera can be selectively rotatable (manually, or via direct or remote control) and selectively fixable at a desired angle for selecting or optimizing the camera view.

The camera and camera mount (if provided) can be placed, e.g., mounted, on or inside the trailer, on the jack, on the hitch, or on or in the vehicle, depending on what a user wishes to view using the camera. As an example, the camera can be mounted inside a trailer for monitoring items inside the trailer (such as but not limited to horse/livestock).

The remote camera may be in wireless communication with the processor-based device for receiving transmitted image data, e.g., video or still image data. The processor-based device may be further in wired or wireless communication with an electric jack, e.g., a remotely-operated controller, for controlling operation of the electric jack. The remote camera, the processor-based device, and the remotely-operated controller can provide a network (e.g., local area, wide area, personal area, etc.) for controlling operation of the electric jack. The processor-based device can include an application installed thereon with computer-executable instructions for controlling the electric jack and for interfacing with a user.

Example control functions performed by the control system include but are not limited to raising and lowering the electric jack. A wired or wireless control signal can be issued by the processor-based device and received by a controller of the electric jack for causing the electric jack to raise and lower. For instance, the user can raise or lower the jack/hitch to mate with a trailer ball.

In some example embodiments, one or more control functions for the jack can be provided by the processor-based device executing the application. Controls may comprise hard controls (buttons, switches, etc.) or soft controls (touch pad or touch interface, selectable displayed controls, voice-operated controls, etc.). For instance, the application may provide the user interface. In other embodiments, the jack is not remotely controlled, and the remote connection is with the remote camera.

One or more control functions for operating the jack and/or the remote camera in some embodiments may be integrated, e.g., by the application, with a camera feed (video feed) provided from the remote camera, for display on a display of the processor-based device. Example integration includes but is not limited to overlaying, superimposing, juxtaposing, arranging, etc. For instance, controls such as up/down arrows for an electric jack and/or movement icons for moving the camera can be superimposed on a video feed from the remote camera for allowing a user to more easily and intuitively interface with the controls. The application and video feed can also be used to verify proper mating between the ball and the hitch. The video feed may be integrated with control functions without using an app in other embodiments. For instance, hard or soft controls for remotely operating the electric jack can be physically integrated with a display showing a camera feed. In other embodiments, the video feed is provided separately (e.g., physically separably) from control functions.

The camera can include or be connected directly or indirectly to an antenna for connecting to the processor-based device using wireless communications, such as with Wi-Fi, Bluetooth, or other radiofrequency (RF) communications, and/or use wired communications. Similarly, the controller for an electric jack can include or be connected directly or indirectly to an antenna for connecting to the processor-based device using wireless communications, such as with Wi-Fi, Bluetooth, or other radiofrequency (RF) communications, and/or use wired communications. The camera can also include a location device, such as a GPS device with suitable GPS capabilities.

Figure 2:
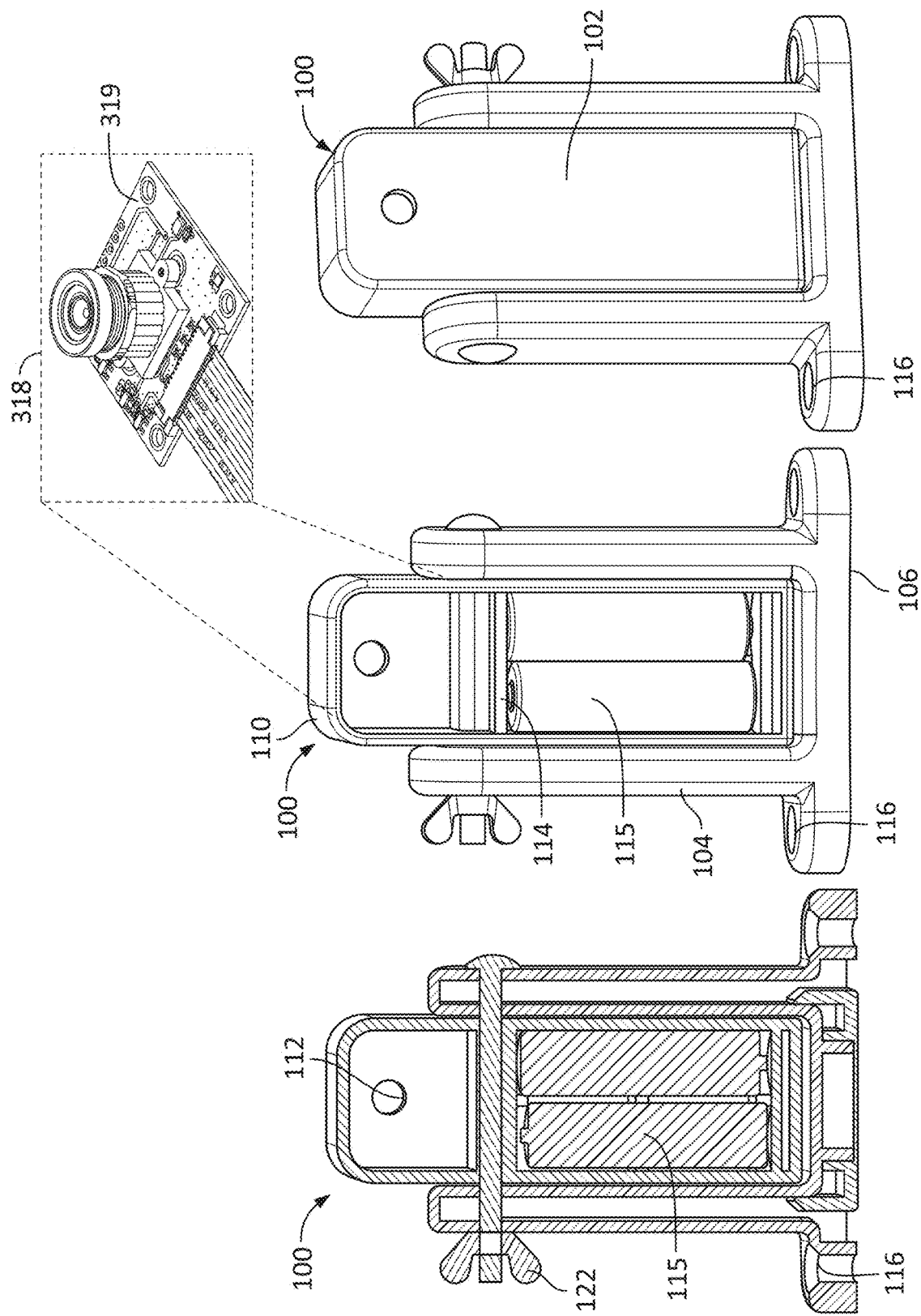
FIGS. 2A-2C show three views of the camera mount of FIG. 1, including a rear sectional view (FIG. 2A), a rear perspective view showing an open battery compartment (FIG. 2B), and a front perspective view (FIG. 2C).

Referring now to the figures, FIG. 1 shows an example camera mount or camera assembly (camera mount) 100 for a remote camera. "Remote" refers to the camera being remote from (that is, situated away from) a processor-based device that receives images generated by the camera. FIGS. 2A-2C show a rear sectional view (FIG. 2A), a rear perspective view showing an open battery compartment (FIG. 2B), and a front perspective view (FIG. 2C) of the camera mount 100. FIGS. 3A-3D show bottom (FIG. 3A), front (FIG. 3B), side (FIG. 3C), and rear (FIG. 3D) views of the camera mount 100.

The camera mount 100 includes a camera housing 102 rotatably coupled to and disposed between opposing brackets 104, which are disposed on (and in an example are unitary with) a mounting base 106. The camera mount 100 can be made of any suitable material, nonlimiting examples of which include glass-filled nylon, durable plastic (such as but not limited to Acrylonitrile butadiene styrene (ABS)), and others.

The camera housing 102 includes an upper compartment 110 for containing at least partially (up to and including entirely) therein a camera and a wireless module, such as but not limited to a Bluetooth module, having an antenna. The camera and/or wireless module may be disposed, e.g., mounted, on one or more printed circuit boards (PCBs), such as but not limited to the PCB 602 shown in FIG. 13 and described in more detail below. For illustration, FIG. 2B shows a camera 318 provided on a PCB 319 that may be housed in the upper compartment 110 and may include a wireless module. The camera and wireless module may be disposed on the same or different PCBs. In other embodiments, the camera may be housed within the upper compartment 110, and the wireless module may be connected to the camera and housed within a separate compartment or a separate housing. An interior of the upper compartment 110 may be configured, e.g., sized and shaped, to accommodate the camera 318 and optionally the wireless module and/or PCB 319.

Figure 3:
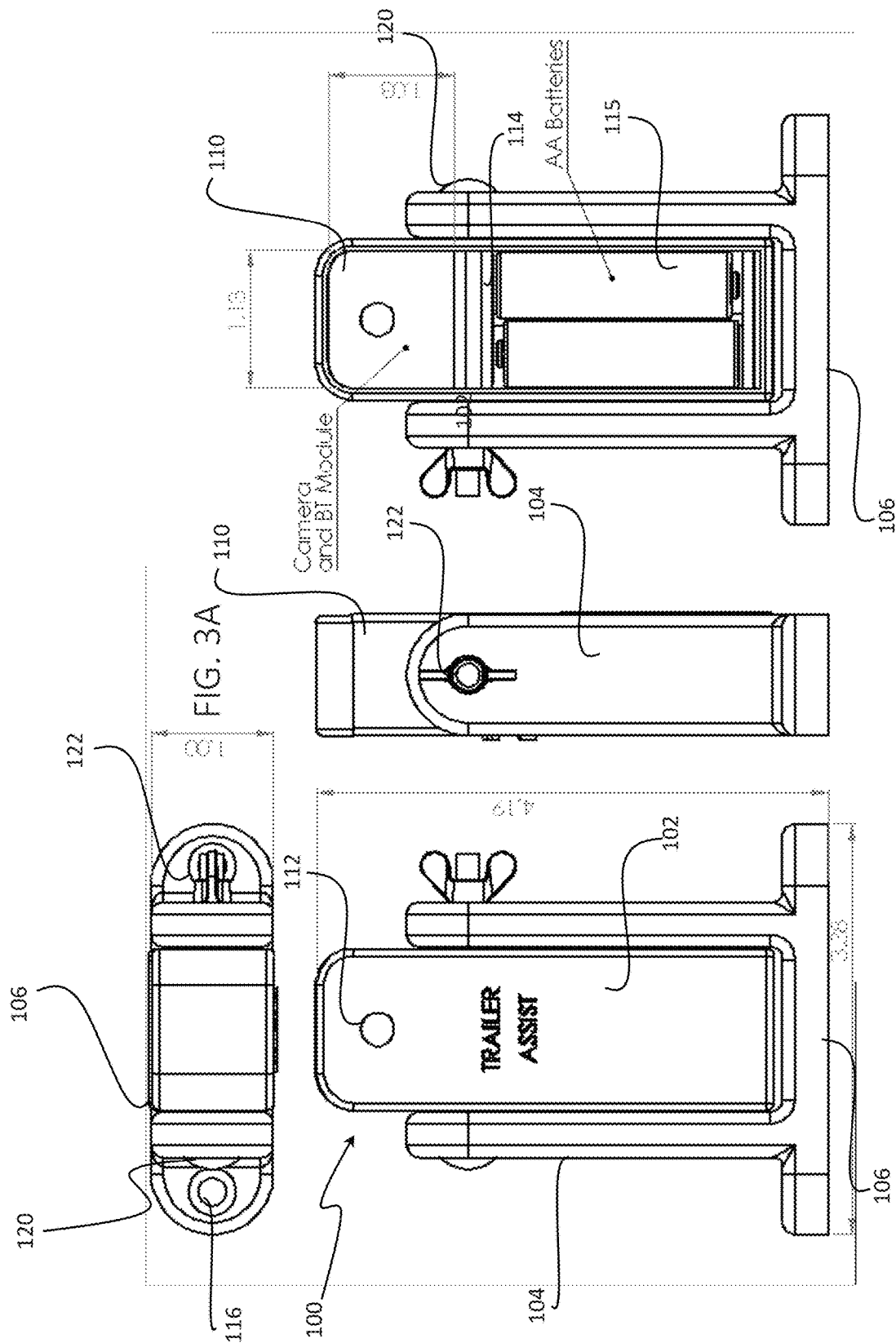
FIGS. 3A-3D show bottom (FIG. 3A), front (FIG. 3B), side (FIG. 3C), and rear (FIG. 3D) views of the camera mount of FIG. 1.

The upper compartment 110 includes an opening 112 for exposing a camera lens of the camera. To power the camera, the camera housing 102 can further include an interior compartment 114 (FIGS. 2A and 2B; FIG. 3D) for housing one or more power sources, such as but not limited to batteries 115, that are coupled to the camera. In other embodiments, the power source may be housed in a compartment or housing separate from the camera housing and connected to the camera.

The mounting base 106 can be made from or include magnetic material, such as ferromagnetic material, for facilitating removable mounting to a (metal) surface. Alternatively or additionally, the mounting base 106 can include or accommodate one or more devices or materials for fixed or removable mounting such as suction cups, fasteners, such screws, bolts, or other fasteners, accommodated via openings such as through holes 116 in the base, removable adhesive, etc.

A rotational coupler 120, such as a threaded bolt, interference fit, spring washer, or other suitable device or mechanism, rotatably connects the camera housing 102 to the brackets 104. A rotational position fixing device, such as but not limited to a wing nut 122, mates with the threaded bolt 120 to fix the camera housing 102 at a desired position (e.g., rotational angle). Though the rotational coupler 120 shown allows for rotation along a single axis, it is contemplated that other couplers or combinations of couplers may be provided for rotation along multiple axes or more generally movement with one or more degrees of freedom.

In some example embodiments, the rotational coupler 120 may be operable, e.g., using an actuator such as a motor coupled thereto, to selectively control rotation of the camera housing 102, though this is not required. The rotational coupler 120 and/or motor may be configured to communicate with a remote device, such as a processor-based device (e.g., a smartphone, tablet computer, vehicle computer, laptop computer, VR or AR display, etc.), for remotely controlling the position of the camera housing 102. Additional motors or actuators may be used to move or position the camera housing 102 for other degrees of freedom if provided. In other embodiments, the rotational coupler may be manually operated to selectively rotate the camera housing and fix the camera housing at the rotated position.

Figure 4:
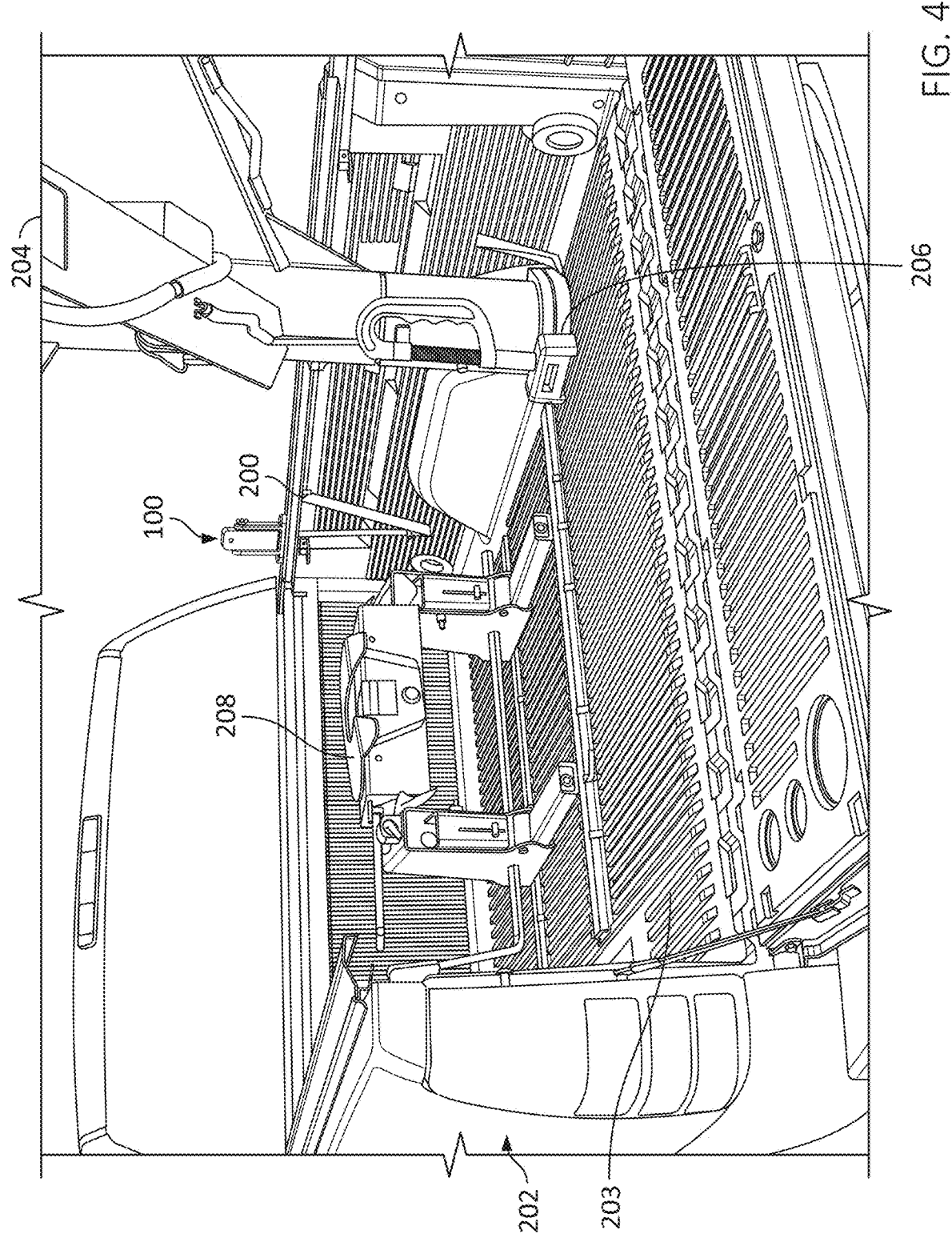
FIG. 4 shows an example mounting environment in which the camera mount of FIG. 1 is mounted on a side of a bed of a truck.

The camera mount 100 can be implemented (e.g., mounted) in various combinations of environments, locations, positions, and orientations, including in or on (e.g., at least partially (up to entirely), over, under, or extending from) a vehicle, in or on an electric jack or other jack, in or on a trailer, on a hitch, etc. FIG. 4 shows an example mounting environment in which the camera mount 100 is mounted on a surface 200 of a vehicle 202, as shown, on a side of a bed 203 of a truck. In this mounting position, the camera in the camera mount 100 can view the position of a trailer 204 and an electric jack 206 with respect to a hitch 208 (a fifth wheel hitch) disposed on the vehicle (as shown, in the bed 203).

Figure 5:
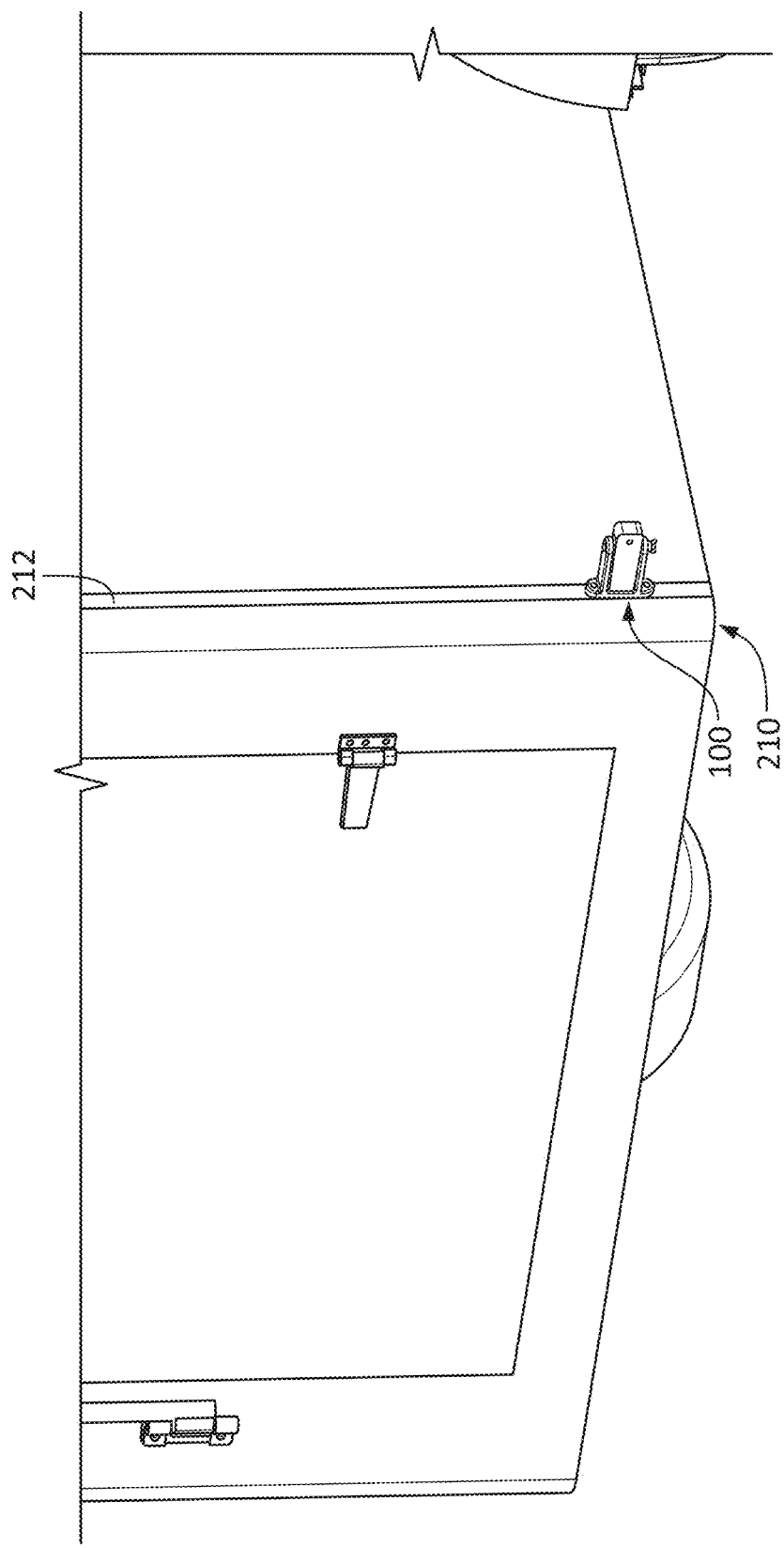
FIG. 5 shows another example mounting environment in which the camera mount of FIG. 1 is mounted to a rear exterior surface of a trailer.

FIG. 5 shows the camera mount 100 mounted to a rear exterior surface 212 of a trailer 210. In other examples (not shown), the camera mount 100 may be mounted to other exterior surfaces, or to an interior surface of the trailer.

Figure 6:
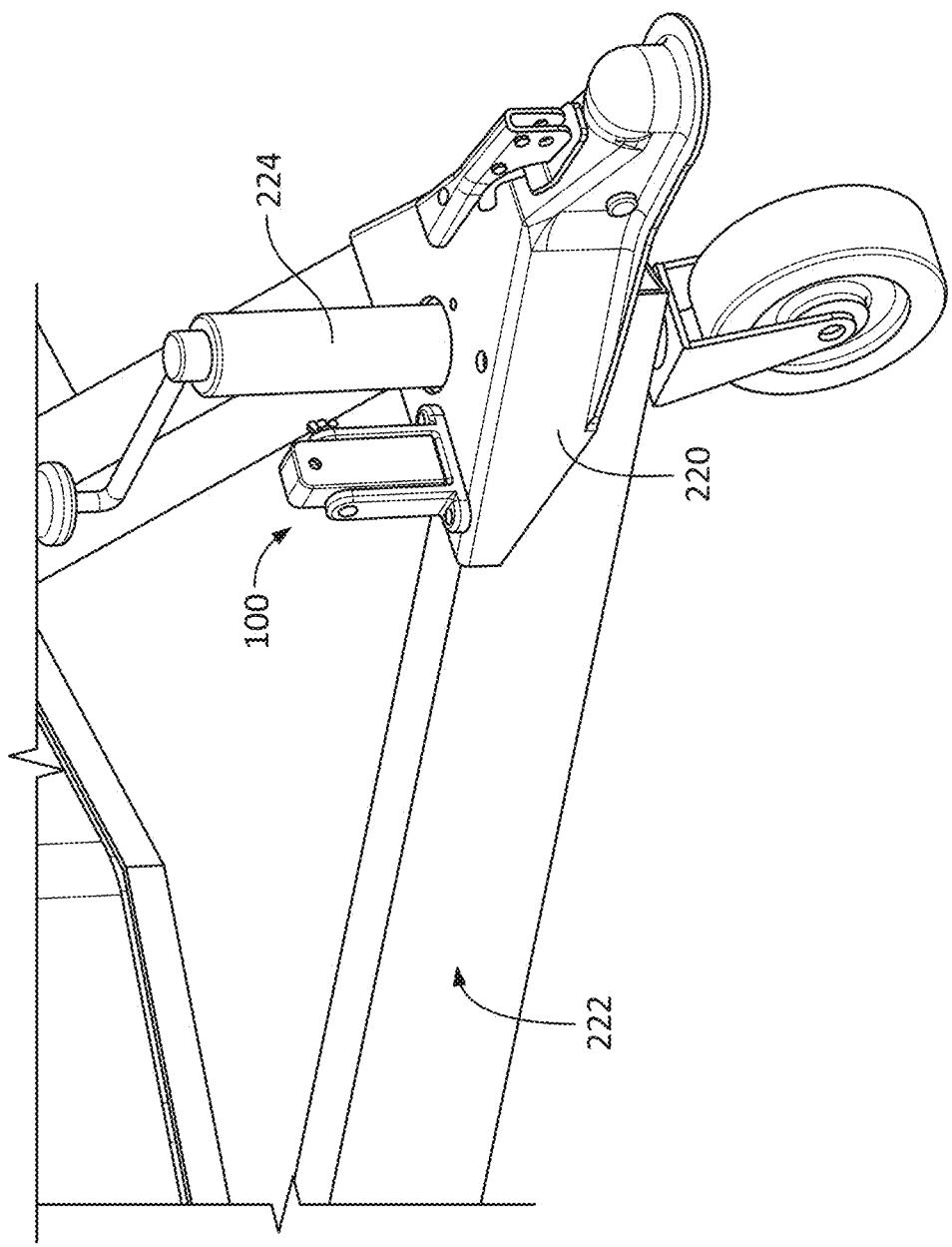
FIG. 6 shows another example mounting environment in which the camera mount of FIG. 1 is mounted to a trailer near an electric jack.
Figure 7:
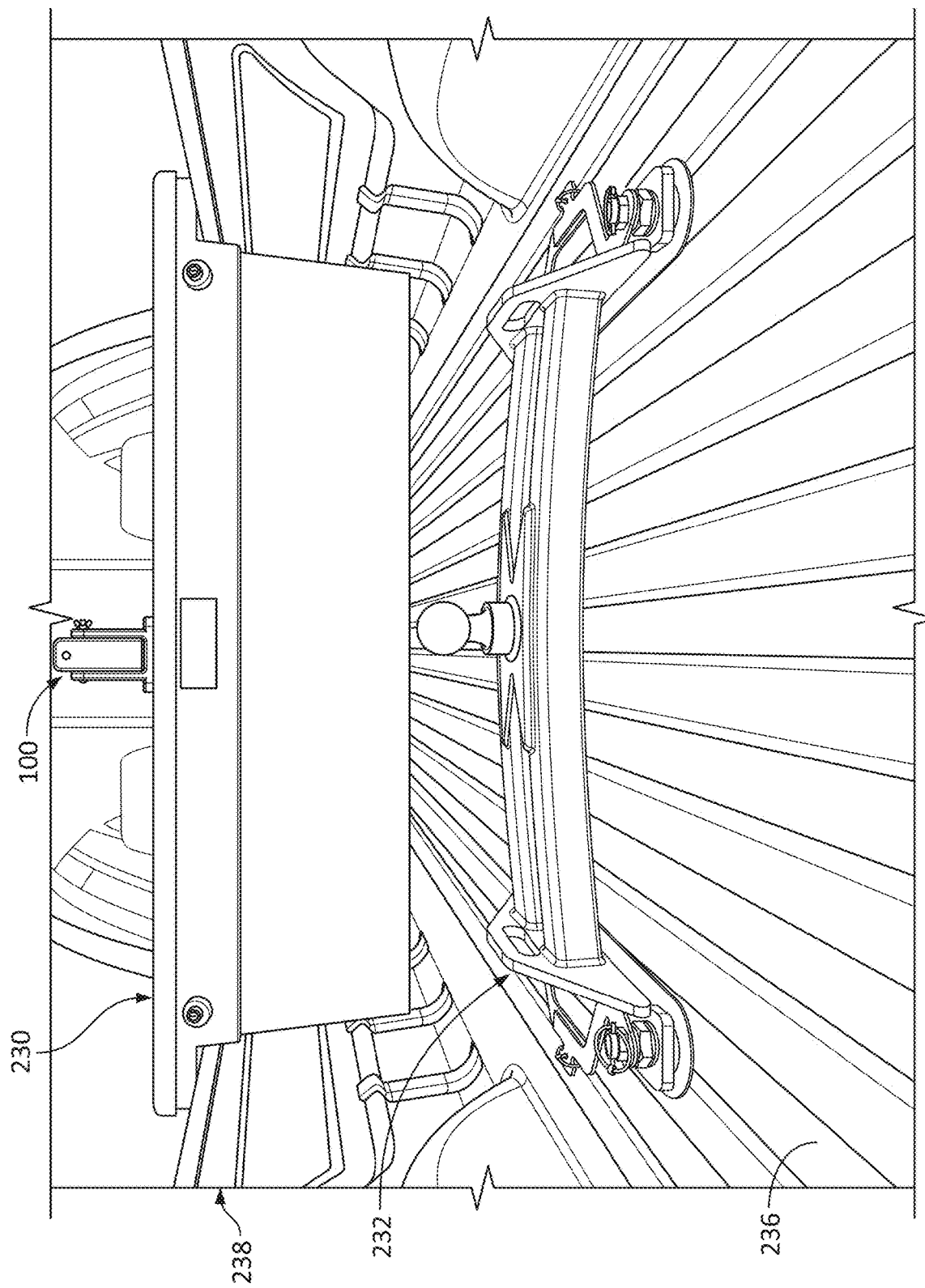
FIG. 7 shows another example mounting environment in which the camera mount of FIG. 1 is mounted on a storage unit for viewing a goose neck hitch on a bed of the truck.
Figure 8:
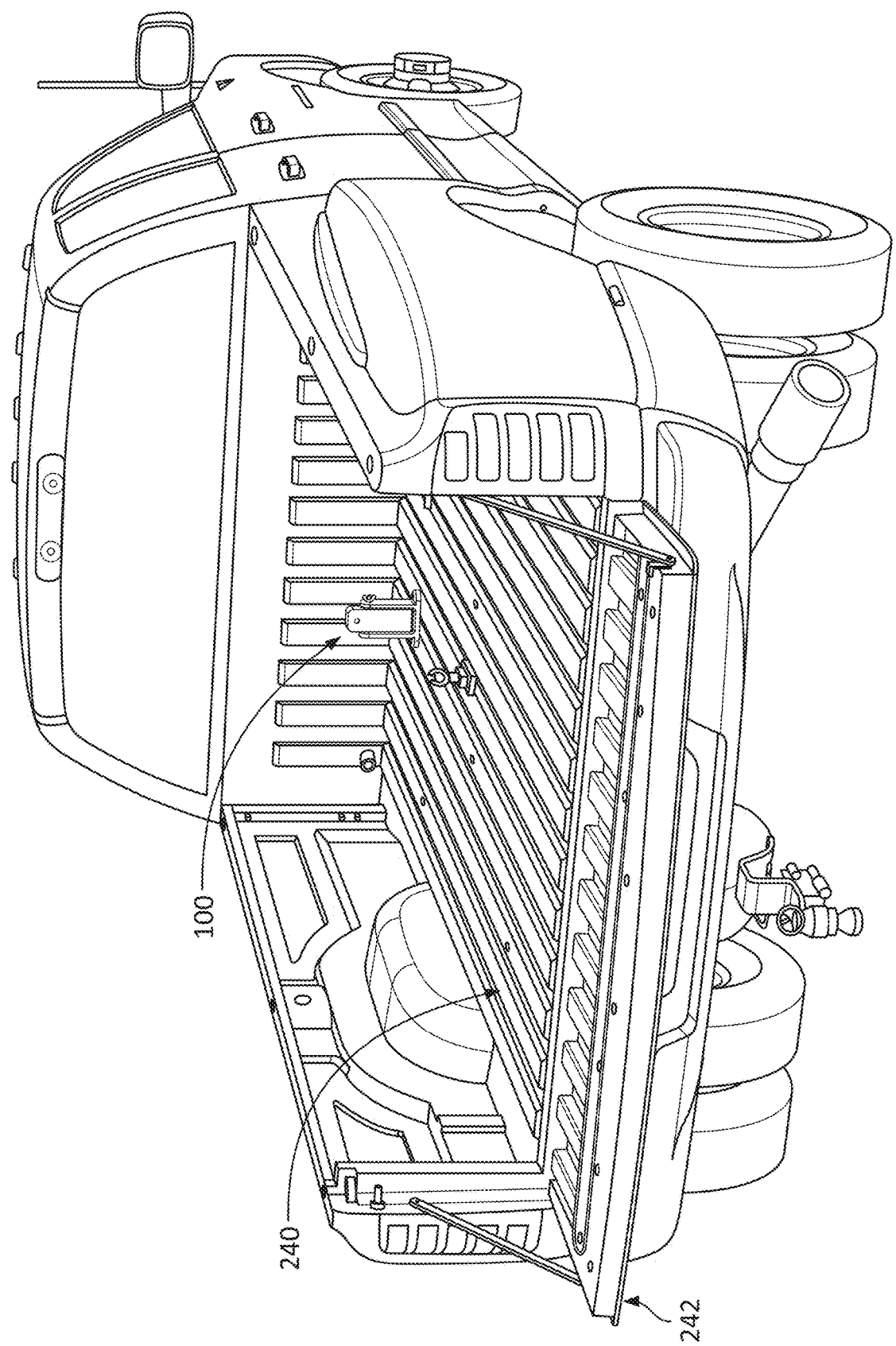
FIG. 8 shows another example mounting environment in which the camera mount of FIG. 1 is mounted on a bed of a truck.

Additional example mounting environments and implementations are shown in FIGS. 6-8. FIG. 6 shows the camera mount 100 being mounted to a tongue or a frame coupler 220 of a trailer 222, disposed near a jack 224. FIG. 7 shows the camera mount 100 being mounted on a storage unit 230 for viewing a goose neck hitch 232. The storage unit 230 and the goose neck hitch 232 are disposed on a bed 236 of a truck 238. FIG. 8 shows the camera mount 100 mounted directly on a bed 240 of a truck 242.

Figure 9:
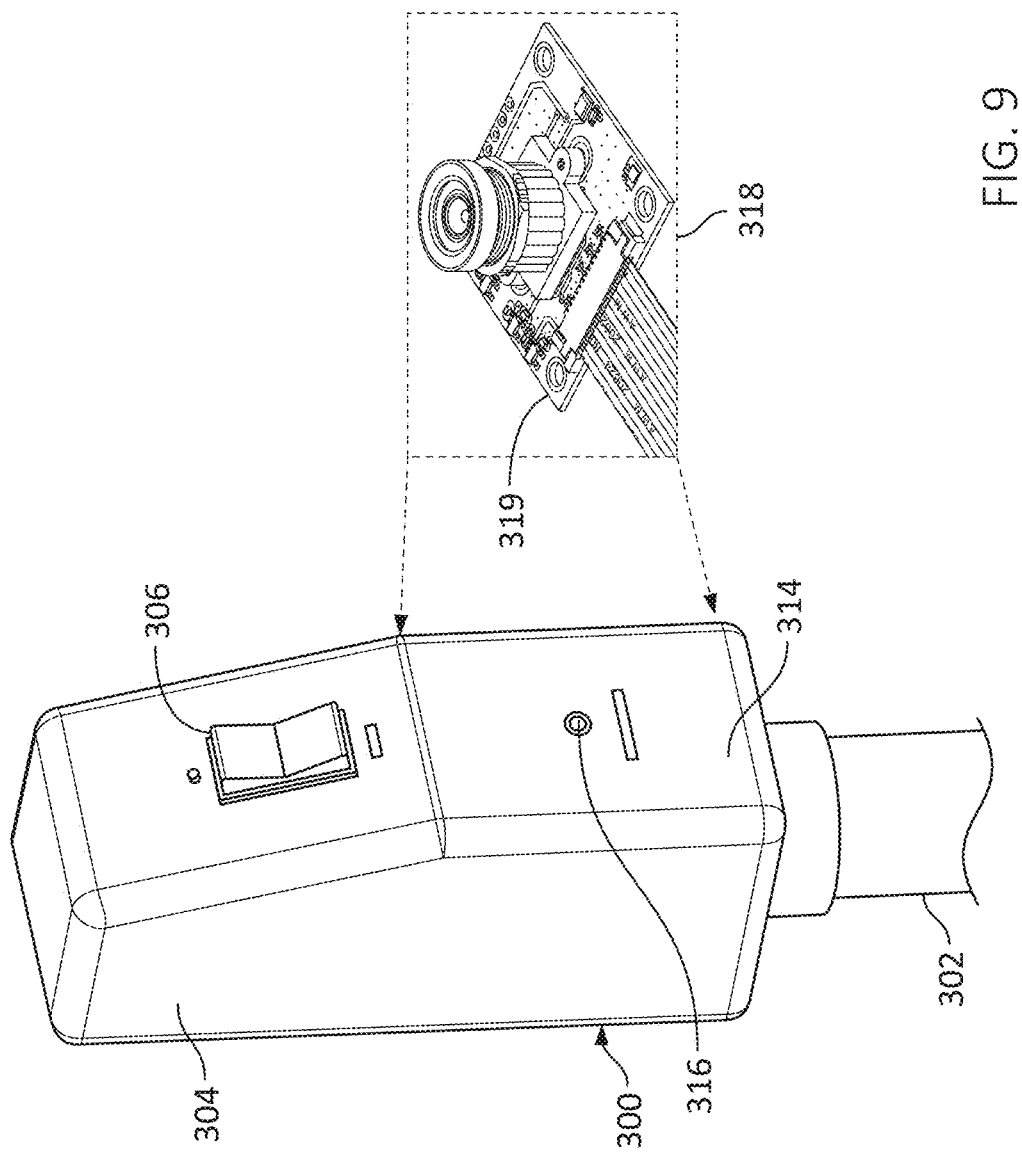
FIG. 9 shows another example camera mount that is integrated with (e.g., into) a control box of an electric jack.
Figure 10:
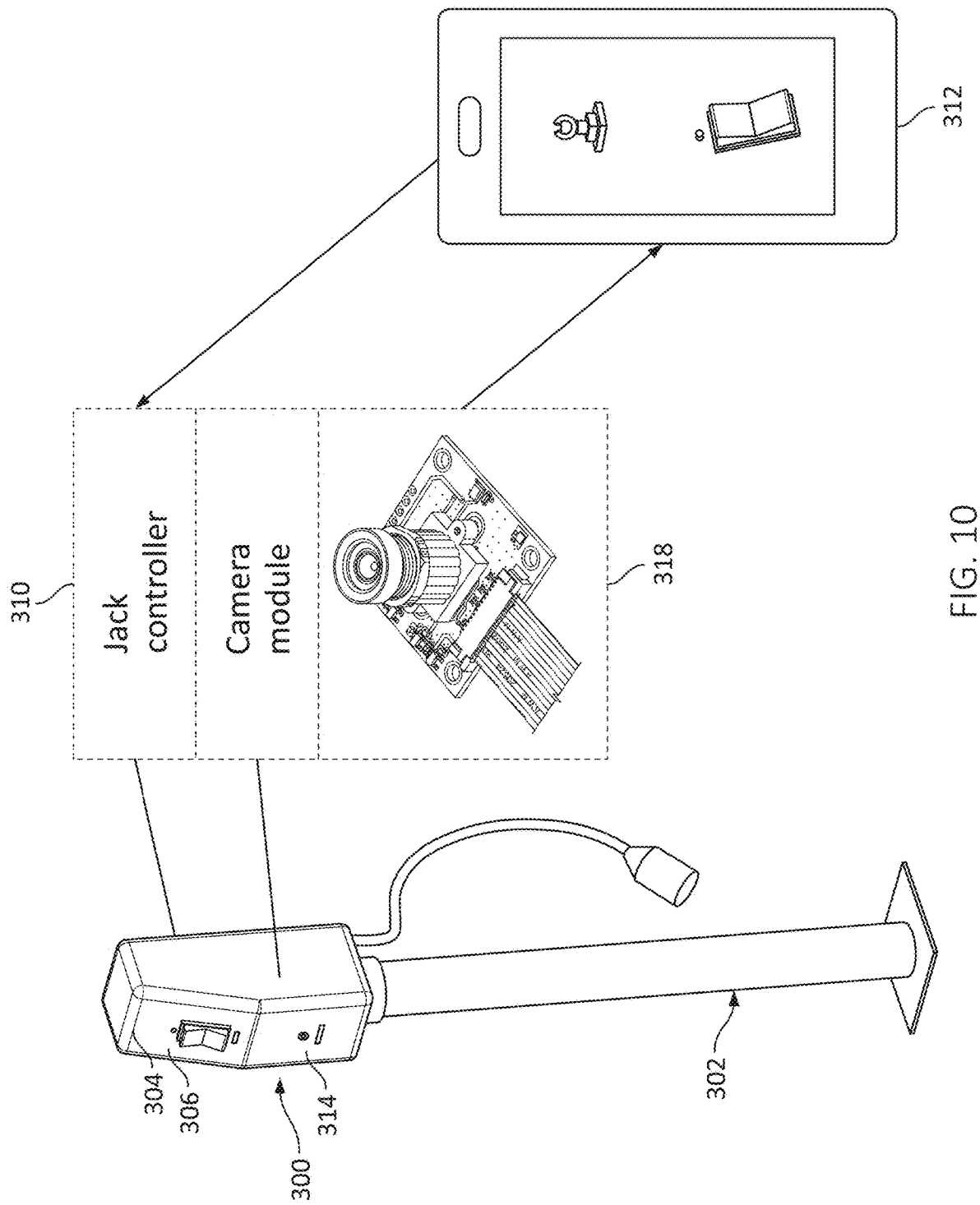
FIG. 10 shows an example electric jack having a control box that can be integrated with the camera mount of FIG. 9.

FIGS. 9-10 show a camera mount 300 according to another embodiment. The camera mount 300 is integrated with (e.g., disposed partially or entirely within and/or sharing a housing or being disposed within a directly or indirectly attached housing) a control box 304 of an electric jack 302. A nonlimiting example electric jack 302 for which the camera mount 300 may be integrated is a General Electric Seachoice 52041, though it will be appreciated that other trailer jacks can be used as well. The control box 304 includes a switch 306, e.g., disposed thereon, for controlling (e.g., raising and lowering) the electric jack 302. The control box 304 may alternatively or additionally include a remote jack controller 310 integrated with the control box and configured to be controlled remotely, e.g., by a processor-based device such as a smartphone 312 or other processor-based device as provided herein, for controlling the height of the electric jack.

The camera mount 300 includes a fixed compartment 314 in the control box 304 housing, which includes an opening 316 for a camera lens of a camera 318 that may be disposed in an interior of the fixed compartment, e.g., coupled to one or more interior surfaces of the fixed compartment. A wireless module, such as a Bluetooth, Wi-Fi, or other RF-based module, having an antenna, can be disposed within the interior of the fixed compartment 314 or other portions of the control box 304 housing, e.g., coupled to one or more interior surfaces of the fixed compartment. The camera 318 and the wireless module may be provided, for instance, on a PCB 319. The wireless module can be shared by the camera 318 and the jack controller 310 if both are provided, or separate wireless modules for each may be used. The interior of the fixed compartment may be configured, e.g., sized and shaped, to accommodate the camera 318 and optionally the wireless module and/or PCB 319.

Figure 13:
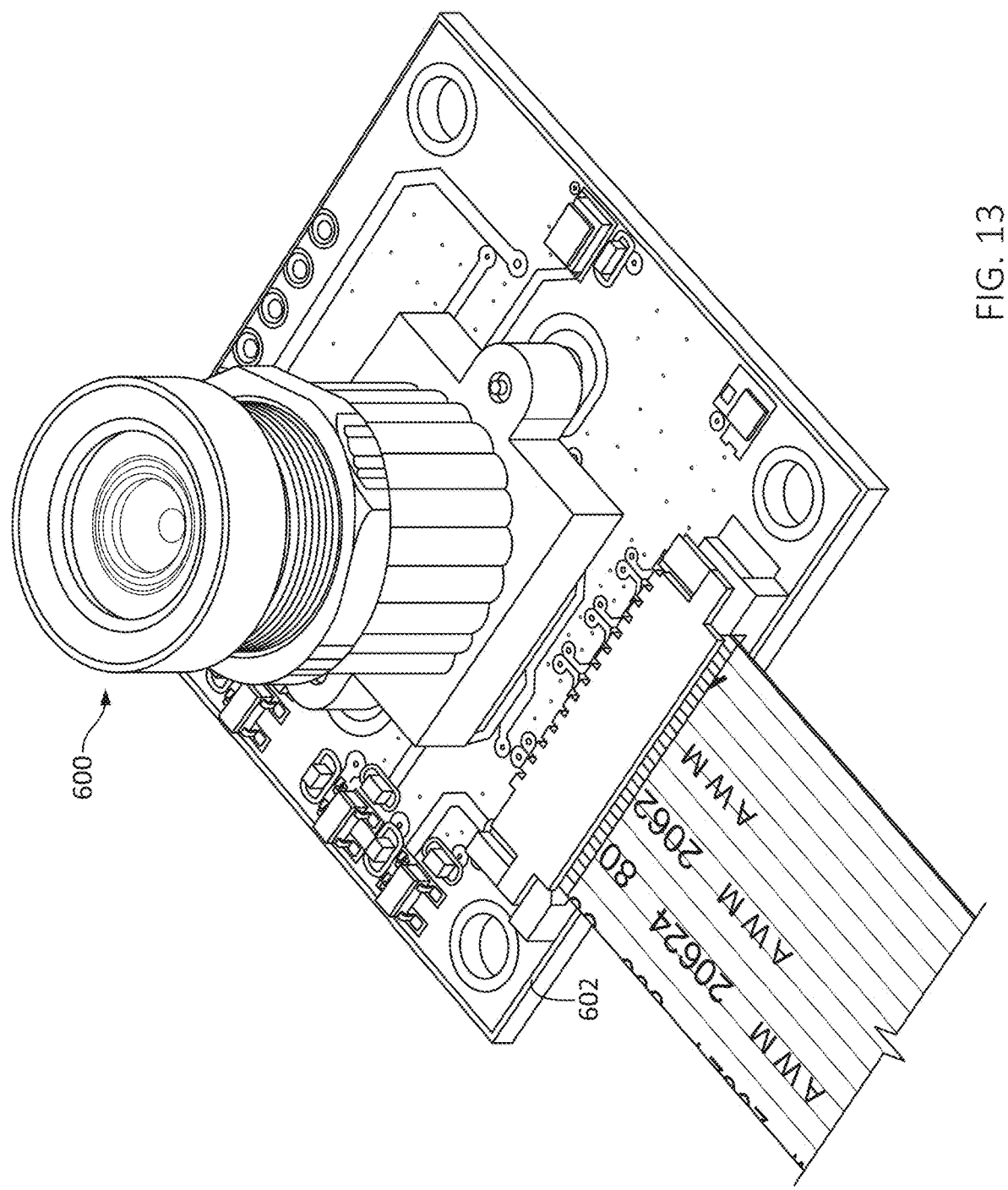
FIG. 13 shows an example camera mounted on a printed circuit board (PCB) for an example camera mount.

An example camera 318 can be mounted on and operably coupled to the printed circuit board (PCB) 319 that can be provided (e.g., as a camera module) in the camera mount 100, 300, for instance disposed in and coupled to one or more interior surfaces of the camera mount. Example cameras and camera modules can be configured similarly to those used for devices such as smartphones, doorbells, drones, etc. FIG. 13 shows an example camera 600 disposed on a PCB 602 for illustration, which PCB may be mounted or otherwise disposed within the upper compartment 110 or fixed compartment 314. A wireless module and antenna may be disposed on the PCB 602. It will be appreciated that other camera and PCB configurations may be used.

The camera 318, 600 and/or the PCB 319, 602 coupled to the camera can include wireless communication components (e.g., antenna, amplifier, transmitter/receiver/transceiver, signal processor, etc., which may be provided as separate components or integrated in one or more wireless modules) integrated in and/or disposed thereon for wirelessly communicating a video feed to the processor-based device. The PCB 319, 602 can further include or be operably connected to a processor such as a microprocessor, and optionally a controller (e.g., a motor control) for raising and lowering the electric jack 302, for instance where the camera mount 300 is integrated in the control box 304 housing or otherwise operably coupled to the electric jack. The camera 318 and/or the wireless module may be powered using any one or more of the power supplies provided herein, such as but not limited to batteries, and/or via a power supply shared with the control box 304 or other components of the electric jack 302.

Figure 11:
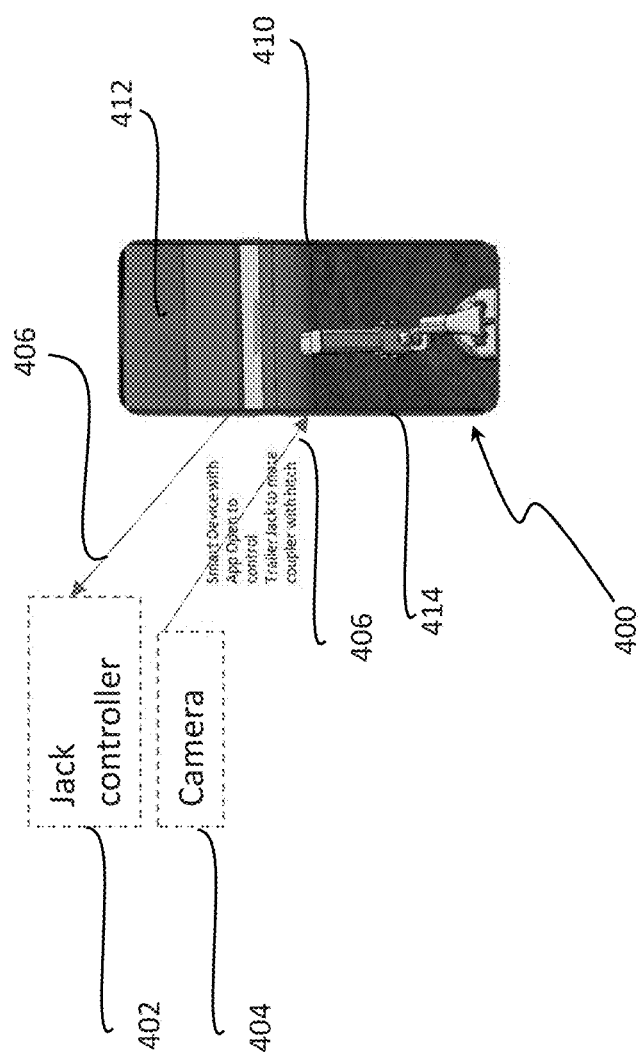
FIG. 11 shows an example processor-based device in communication with a jack controller and a camera via communication links.

FIG. 11 shows an example processor-based device embodied in a smartphone 400. The smartphone is in communication with the camera 404 (which may be configured similarly to camera 318, 600), and optionally a jack controller 402, via communication links 406. Though the communication links are shown as being in one direction, two-way communication links can also be provided (e.g., to receive feedback or a response from the jack controller, to send control signals to the camera and/or a camera mount for operating or positioning the camera, etc.). A display 410 of the smartphone executing an application (app) using a processor and memory can include soft controls such as up and down arrows 412 overlaid on an image (e.g., a video image) 414 showing a coupler of the trailer and a hitch for assisting with mating the coupler and the hitch. The application may be embodied in computer-executable instructions that are stored in memory or suitable storage on the smartphone 400 (or other processor-based device) for execution by the processor of the smartphone (or other processor-based device). The smartphone or other processor-based device may alternatively or additionally include hard controls (buttons, dials, joystick, etc.) for a user interface.

Figure 12:
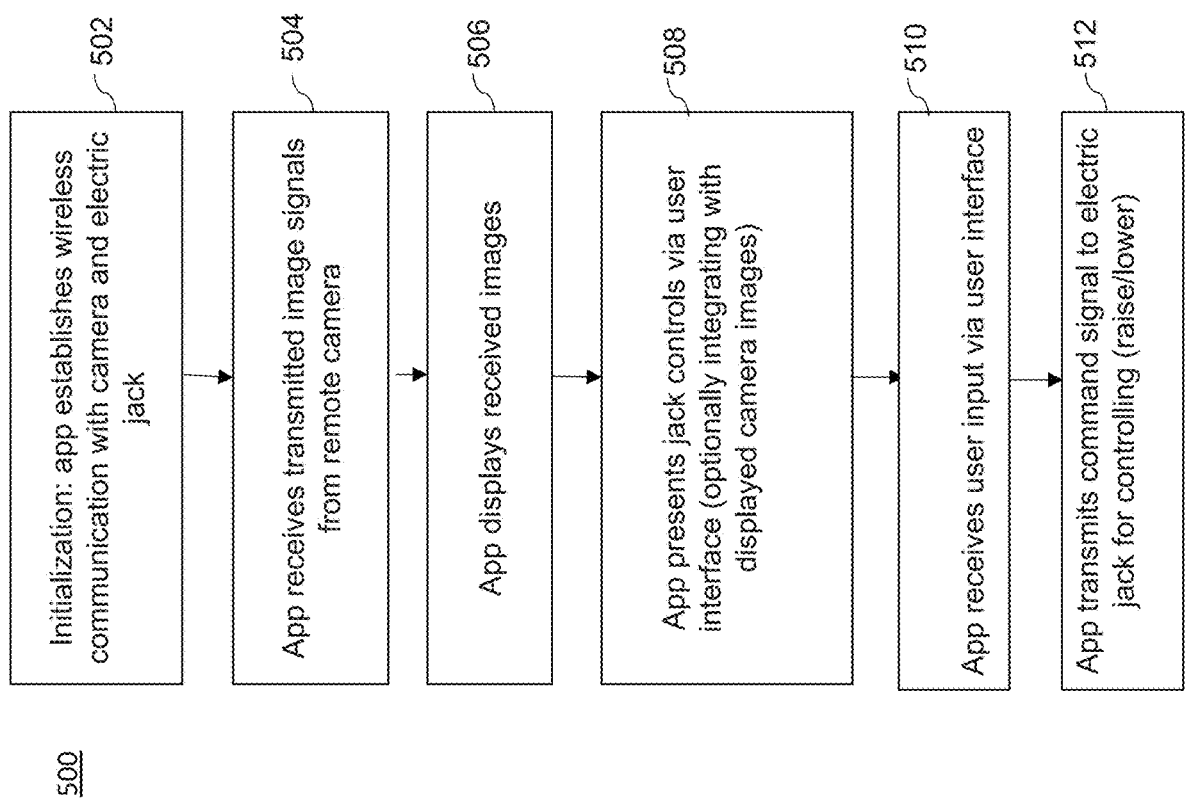
FIG. 12 shows an example method for operating an electric jack using a smartphone app.

FIG. 12 shows an example method 500 for interfacing with a camera 318, 600 and optionally operating an electric jack using a smartphone app. Though the example method 500 will be described with respect to smartphone 400, it will be appreciated that the method 500 may likewise be performed by other example processor-based devices. The app includes computer-executable instructions executable by the processor and memory of the smartphone to perform example methods.

At 502, the app is initialized (e.g., launched) on the smartphone 400, and wireless communication links 406 are established or confirmed between the smartphone and the camera 318, 600 and the control box 304 of the electric jack 302, e.g., via the remotely operable jack controller 310. If the electric jack 302 is not operated by the app, e.g., it is operated directly via controls on the control box 304 or in other ways, the communication link 406 with the camera 318, 600 may be used without interfacing with the jack controller. Establishing the wireless communication links 406 can be provided using methods that will be appreciated by those of ordinary skill in the art. Links 406 may be secure (e.g., encrypted) in example embodiments, though unsecure links are possible. The app may indicate a status of the camera 318, 600 and/or the electric jack 302 (e.g., connection status, power status, use history, etc.).

The camera 318, 600 produces image signals, e.g., video or still image signals, from images obtained by the camera lens, and transmits the image signals wirelessly to the smartphone's wireless receiver for processing and displaying by the app at 504. This may be performed either automatically, e.g., upon an established connection, upon the occurrence of an event (e.g., a measured, calculated, or otherwise determined distance from the vehicle, hitch, etc.), performed in response to a request from the smartphone 400, or otherwise. One or more received images may be stored in a buffer or cache by the app, discarded, or a combination. The camera 318, 600 may be configured to perform local processing of the image before transmission (compression, error correction, filtering, etc.), but this is not required.

At 506, the app displays the received images, e.g., image 414, from the camera 318, 600 on a display of the smartphone 400 and/or on a connected display. The images 414 may be processed by the app in any suitable way (compressed, filtered, cropped, error-corrected, lightened, darkened, etc.) before displaying. The app may also process the received images to provide additional data (e.g., distance, proximity, alignment, etc.), and the results (e.g., measurements, alerts, scales, etc.) may be displayed by the app, alone, in combination with, or integrated with the images. Steps 504 and 506 may continually be updated while other steps in the method 500 are performed.

If the app is also being used to control the electric jack 302 remotely, the app may also present one or more controls, such as controls 412, to the user via a user interface at 508. The user interface can include the display (e.g., displayed controls, icons, labels, control options), via hard or soft controls (e.g., buttons, switches, voice controls via microphone, or other input/output devices on the phone), or via a combination. In the example shown in FIG. 11, the controls 412 are soft controls (up and down arrows) integrated with the displayed image 414 by overlaying the controls. The controls may also include one or more camera controls for operating the camera or the camera mount (on/off, position, etc.).

The app waits for an input. In response to receiving an input from the user via the user interface of the smartphone at 510, the app (if being used to control the electric jack 302) sends a command signal to the control box 310 of the electric jack at 512, e.g., wirelessly via the jack controller. The input may be processed by the app before the command is generated and transmitted. For instance, if the processor executing the app determines that it would be unsafe to lower the electric jack 302 in view of the received image, an alert could be generated, or the command could be altered or rejected. The jack controller 310 receives the command signal, processes the signal if needed, and provides a control signal to the control box 304 to raise or lower the electric jack 302. Steps 504, 506, and 508 can be repeated to display new image data and receive new user input.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About can be understood as within 20%, 19%, 18%, 17%, 16%, 15%, 14%, 13%, 12%, 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99%, or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

A number of embodiments of the invention have been described. Nevertheless, it can be understood that various modifications may be made without departing from the spirit and scope of the invention. Accordingly, other embodiments are within the scope of the following claims.

What is claimed is:

1. A control box for an electric jack, the control box comprising:

a control box housing;

a camera;

a remote jack controller for controlling a height of the electric jack;

at least one wireless module for providing wireless communication with said camera and said remote jack controller; and a camera mount for the camera and the at least one wireless module, said camera mount being integrated within said control box housing and including an opening for a lens of said camera;

wherein said camera mount comprises a fixed compartment disposed within said control box housing, the fixed compartment including the opening for the lens;

wherein said camera, said remote jack controller, and said at least one wireless module are disposed within an interior of the fixed compartment; and wherein said camera, said remote jack controller, and said at least one wireless module are disposed on at least one printed circuit board, the at least one printed circuit board being disposed within the interior of the fixed compartment.

2. The control box of claim 1, further comprising:

a processor-based device configured for wireless communication with said camera using a wireless protocol.

3. The control box of claim 2, wherein the processor-based device comprises an application for displaying images transmitted from the camera.

4. The control box of claim 2, wherein said remote jack controller is configured for wireless communication with said processor-based device using a wireless protocol.

5. The control box of claim 4, wherein the processor-based device comprises an application for displaying images transmitted from the camera; and wherein the application further provides a user interface for a user to control the electric jack.

6. The control box of claim 5, wherein the processor-based device comprises an application for displaying images transmitted from the camera; and wherein the application is further configured for integrating one or more controls for the jack controller with the displayed images.

7. A method for controlling an electric jack by a processor-based device, the method comprising:

receiving, by an application on the processor-based device, video image signals wirelessly transmitted from a remote camera, the remote camera being in a housing that is integrated within a control box of the electric jack, the housing containing therein a remote jack controller for controlling a height of the electric jack, at least one wireless module for providing wireless communication with said remote camera and said remote jack controller, and at least one printed circuit board on which the remote camera, the remote jack controller, and the at least one wireless module are disposed;

the application displaying a video image from the received video image signals;

the application presenting one or more controls for controlling the trailer jack via a user interface;

in response to receiving an input from a user via the user interface, the application wirelessly transmitting a command signal to the remote jack controller via the at least one wireless module for raising or lowering the electric jack;

the remote jack controller being configured to raise or lower the electric jack in response to the received command signal.

8. The method of claim 7, wherein the user interface is integrated with the displayed video image.

9. A control box for an electric jack, the control box comprising:

a control box housing;

a camera;

a switch disposed on said control box housing for controlling a height of the electric jack;

a wireless module providing wireless communication with said camera; and a camera mount for the camera and the wireless module, said camera mount being integrated within said control box housing and including an opening for a lens of said camera;

wherein said camera mount comprises a fixed compartment disposed within said control box housing, the fixed compartment including the opening for the lens;

wherein said camera and said wireless module are disposed within an interior of the fixed compartment; and wherein said camera and said wireless module are disposed on at least one printed circuit board, the at least one printed circuit board being disposed within the interior of the fixed compartment.

10. The control box of claim 9, further comprising:

a processor-based device configured for wireless communication with said camera using a wireless protocol.

11. The control box of claim 10, wherein the processor-based device comprises an application for displaying images transmitted from the camera.

* * * * *